(12) United States Patent
Seberger

(10) Patent No.: US 6,971,626 B2
(45) Date of Patent: Dec. 6, 2005

(54) INDEPENDENT INTELLIGENT LIMIT SWITCH

(75) Inventor: Stephen George Seberger, Marshalltown, IA (US)

(73) Assignee: Fisher Controls International LLC., St. Louis, MO (US)

( * ) Notice: Subject to any disclaimer, the term of this patent is extended or adjusted under 35 U.S.C. 154(b) by 38 days.

(21) Appl. No.: 10/795,864

(22) Filed: Mar. 8, 2004

(65) Prior Publication Data

US 2005/0194554 A1 Sep. 8, 2005

(51) Int. Cl.[7] .............................................. G05B 19/05
(52) U.S. Cl. .................. 251/129.04; 251/284
(58) Field of Search ............................ 251/129.04, 284

(56) References Cited

U.S. PATENT DOCUMENTS

| | | | |
|---|---|---|---|
| 4,702,335 A * | 10/1987 | Cage et al. ................. | 180/423 |
| 4,844,110 A * | 7/1989 | Paley ............................. | 137/1 |
| 5,450,346 A | 9/1995 | Krummen et al. | |
| 6,058,706 A | 5/2000 | Aschner et al. | |
| 6,283,139 B1 * | 9/2001 | Symonds et al. .......... | 137/78.3 |
| 6,574,515 B1 | 6/2003 | Kirkpatrick et al. | |
| 6,612,331 B2 * | 9/2003 | Cederstav et al. ....... | 137/487.5 |
| 2003/0178530 A1 * | 9/2003 | Tartaglia et al. ......... | 244/110 R |
| 2003/0212507 A1 | 11/2003 | Wei et al. | |

OTHER PUBLICATIONS

International Search Report for PCT/US2005/003836 dated Apr. 28, 2005.

Written Opinion for PCT/US2005/003836 dated Apr. 28, 2005.

* cited by examiner

*Primary Examiner*—J. Casimer Jacyna
(74) *Attorney, Agent, or Firm*—Marshall, Gerstein & Borun LLP

(57) ABSTRACT

A digital valve positioning system is disclosed. The system comprises a valve, a valve controller having a controller microprocessor and a controller memory and a valve actuator having an output coupled to the valve to control the position of the valve over a range of motion in response to an output from the valve controller. The system further comprises a first position sensor for determining the position of the valve actuator and an intelligent limit switch for generating a limit switch state signal indicative of a state of the valve being above or below a threshold set point. The limit switch comprises a second position sensor generating an output signal indicative of the position of the valve, a limit switch memory, a limit switch microprocessor communicatively coupled to the limit switch memory, an isolated communication link between the controller microprocessor and the limit switch microprocessor for transferring the set point data from the controller to the limit switch. The limit switch microprocessor includes a first limit switch microprocessor output, the limit switch microprocessor being responsive to the second position sensor output signal and the set point data stored in the limit switch memory to generate the state signal at the first limit switch microprocessor output.

30 Claims, 2 Drawing Sheets

INDEPENDENT INTELLIGENT LIMIT SWITCH

BACKGROUND OF THE INVENTION

Conventional limit switch implementations are generally categorized as: 1) a dependent-embedded system or 2) an independent physical system. The dependent-embedded design utilizes position feedback data from the feedback element within the instrument to provide a virtual limit switch. The main disadvantage of this embedded implementation is that the "switch" is not isolated or independent from the operation of the instrument and is wholly dependent on the instrument's operation. These types of limit switches cannot be used for an interlock application.

The independent physical limit switch solves the isolation issue associated with the embedded design, but since it is not integrated within the microprocessor-based instrument, the instrument's calibration and limit switch trip point set are not coupled. The complete and "un-intelligent" aspect of the independent, physical switches requires resetting the trip point each time the instrument is recalibrated. Additionally, the setup of the limit switches is typically blind and requires taking the valve out of operation to specifically stroke the valve to establish the trip points. Some manufacturers utilize both implementations, but still do not solve the aforementioned disadvantages.

DETAILED DESCRIPTION OF A PREFERRED EMBODIMENT

Figure 1:
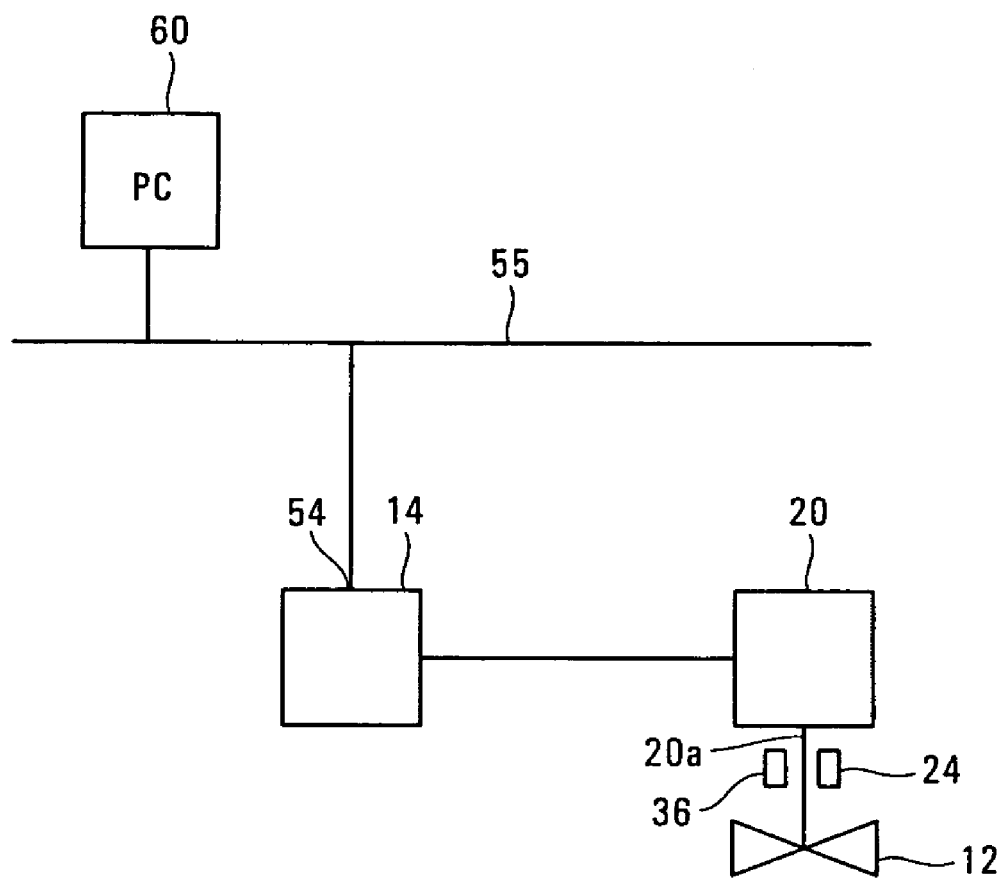
FIG. 1 is a block diagram of a digital valve positioning system in accordance with the present invention.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

This invention incorporates a low-cost dedicated microprocessor to physical limit switches to provide an independent, intelligent limit switch assembly. The limit switch embedded controller can communicate to the instrument microprocessor to establish trip points, but still provide isolated operation appropriate for interlock operation.

Figure 2:
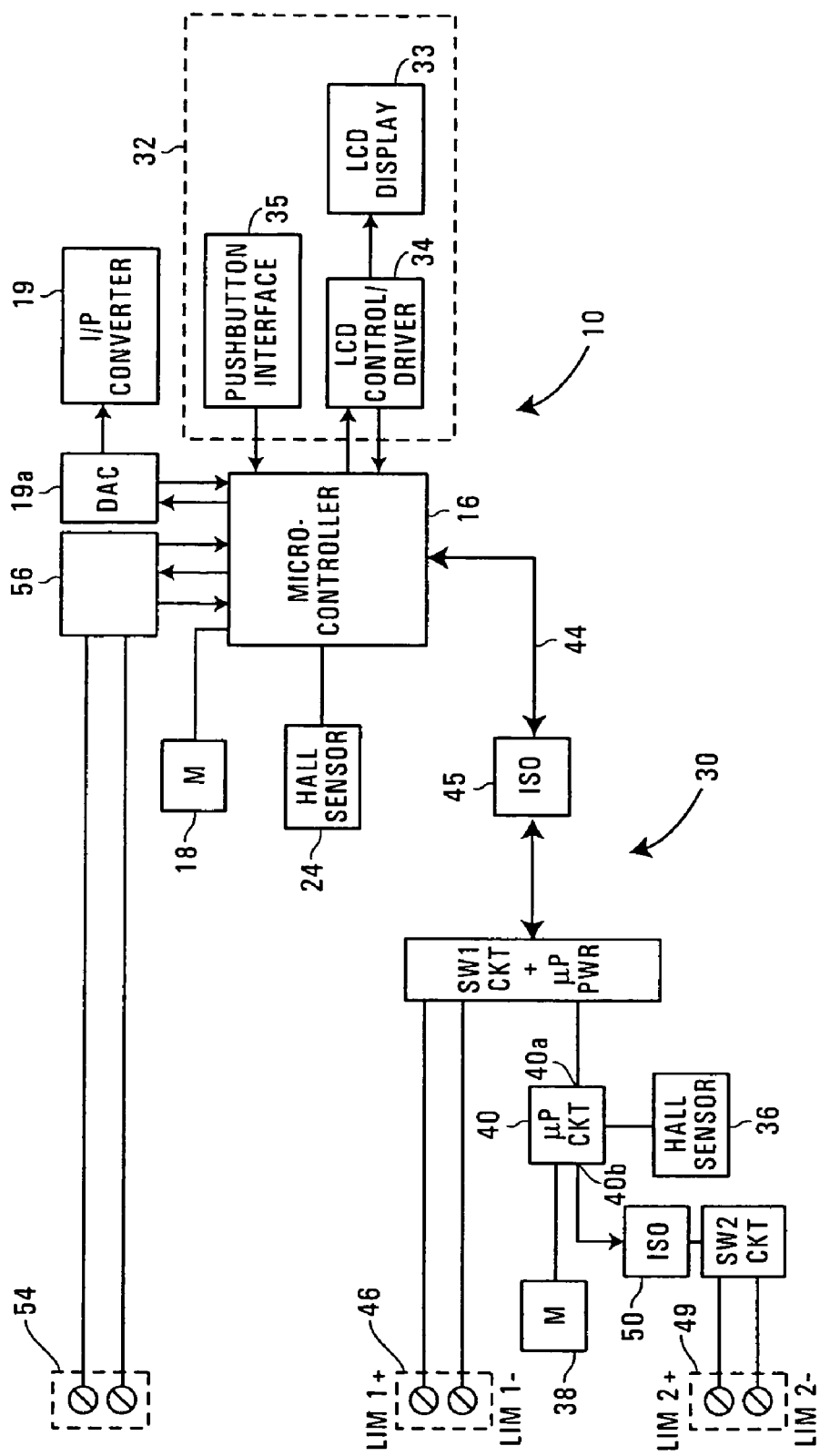
FIG. 2 is a block diagram of an independent intelligent limit switch, as used with the positioning system of FIG. 1.

A digital valve positioning system, generally designated 10, is illustrated in FIGS. 1 and 2. The system 10 comprises a valve 12 and a valve controller 14. The valve controller 14 has a controller microprocessor 16 and a controller memory 18. As is well known, the controller microprocessor 16 controls the position of the valve 12 by issuing commands to a current to pressure (I/P) converter 19 via a digital to analog (D/A) converter 19a.

The system 10 further includes a valve actuator 20 having an output 20a coupled to the valve 12 to control the position of the valve 12 over a range of motion in response to an output from the valve controller 14. A first position sensor 24, such as a conventional Hall effect sensor, determines the position of the valve 12.

As is well known, the controller memory stores calibration data defining the range of motion of the valve 12.

In accordance with the invention, the system 10 further includes an intelligent limit switch 30 for generating a limit switch state signal indicative of a state of the valve 12 being above or below a threshold set point.

The limit switch 30 utilizes an operators interface 32 communicatively coupled to the controller microprocessor 16 for entering limit switch set point data defining the location of the threshold set point into the controller memory 18. The operators interface 32 includes a display 33, such as an LCD display 34 and an LCD control/driver 34, which can be used to indicate the state of the limit switch 30. The operators interface 32 also includes a pushbutton interface 35. In the present embodiment, the limit switch 30 utilizes the same operators interface 30 as is used to perform conventional communication with the controller microprocessor 16, such as to enter the calibration data.

The limit switch 30 further includes a second position sensor 36, also such as a Hall effect sensor, and a limit switch memory 38. The second position sensor 36 generates an output signal indicative of the position of the valve 12. The limit switch memory 38 is communicatively coupled to a limit switch microprocessor 40.

A communication link 44 including a first optical isolation unit 45 provides isolated communication between the controller microprocessor 16 and the limit switch microprocessor 40 for transferring the limit switch set point data from the controller memory 18 to the limit switch memory 38.

The limit switch microprocessor 40 includes a first limit switch microprocessor output 40a. The limit switch microprocessor 40 is responsive to the second position sensor output signal and the limit switch set point data stored in the limit switch memory 38 to generate the state signal at the first limit switch microprocessor output 40a.

A first limit switch output 46 is communicatively coupled to the first limit switch microprocessor output 40a for generating a first limit switch output signal indicating the state of the limit switch. The first output signal is preferably a current control signal, such as a 1–4 mA signal.

The limit switch 30 also provides a second output, permitting the limit switch 30 to function as two limit switches. Specifically, the operators interface 32 is communicatively coupled to the controller microprocessor 16 for entering, into the controller memory 18, second limit switch data defining the location of a second threshold set point.

The isolated communication link 44 transfers the second limit switch set point data from the controller memory 18 to the limit switch memory 38. The limit switch microprocessor 40 includes a second limit switch microprocessor output 40b. The limit switch microprocessor 40 is responsive to the second position sensor output signal and the second limit switch set point data stored in the limit switch memory 38 to generate a second state signal, indicative of a second state of the valve 12 being above or below the second threshold set point, at the second limit switch microprocessor output.

The limit switch 30 includes a second output 49 coupled to the limit switch microprocessor second output for generating a second output signal indicating the secondary state of the limit switch. The second output signal is a current control signal, such as a 1–4 mA signal.

A second optical isolation unit 50 optically isolates the second limit switch from the first limit switch.

The limit switch data defines the location of the threshold set point as a percentage of the range of motion. Thus if the valve fails, or otherwise must be replaced, it need only be recalibrated. The limit switch set point data does not need to be changed and the limit switch calibration data is automatically adjusted through the communication link 44 as part of the valve calibration process.

The limit switch 30 is powered by the current control signal, which is independent of the controller power to the valve control. Thus failure of the controller power will not affect the operation of the limit switch 30.

The limit switch 30 operates independent of the valve controller 14. Thus failure of the valve controller 14 will not affect the operation of the limit switch 30.

The system 10 includes a connector 54 for communicatively coupling the controller microprocessor 16 to a network 55 via a conventional communications interface 56. This permits analog and/or digital communication with other devices on the network 55, such as a process controller 60.

The present invention has been described with respect to a certain embodiment, which is not meant to limit the invention. Those skilled in the art will understand that variations from the embodiment described herein may be made without departing from the invention as set forth in the appended claims.

What is claimed is:

1. For a digital valve positioning system comprising a valve, a valve controller having a controller microprocessor and a controller memory, a valve actuator having an output coupled to the valve to control the position of the valve over a range of motion in response to an output from the valve controller, and a first position sensor for determining the position of the valve actuator, an intelligent limit switch for generating a limit switch state signal indicative of a state of the valve being above or below a threshold set point, the limit switch comprising:
   a second position sensor generating an output signal indicative of the position of the valve;
   a limit switch memory;
   a limit switch microprocessor communicatively coupled to the limit switch memory;
   a communication link between the controller microprocessor and the limit switch microprocessor for transferring the set point data from the controller to the limit switch, wherein the limit switch microprocessor includes a first limit switch microprocessor output, the limit switch microprocessor being responsive to the second position sensor output signal and the set point data stored in the limit switch memory to generate the state signal at the first limit switch microprocessor output.

2. The limit switch of claim 1 wherein the location of the threshold set point is defined by threshold set point switch data.

3. The limit switch of claim 1 including an operators interface communicatively coupled to the controller microprocessor for manipulating the threshold set point switch data.

4. The limit switch of claim 2, wherein the threshold set point data is expressed as a percentage of the range of motion of the valve.

5. The limit switch of claim 1, wherein the communications link is optically isolated.

6. The limit switch of claim 1 wherein the limit switch operates independent of the controller.

7. The limit switch of claim 1 wherein the threshold set point is such that the state of the limit switch microprocessor output indicates that the valve is fully open.

8. The limit switch of claim 1 wherein the threshold set point is such that the state of the limit switch microprocessor output indicates that the valve is fully closed.

9. The limit switch of claim 1 wherein the state of the limit switch microprocessor output indicates whether the valve position is above or below a predetermined position between fully open and fully closed.

10. The limit switch of claim 1 wherein the operators interface includes a display indicating the state of the limit switch.

11. The limit switch of claim 10 wherein the display is an LCD display.

12. The limit switch of claim 1 including a first limit switch output coupled to the first limit switch microprocessor output for generating a first limit switch output signal indicating the state of the limit switch.

13. The limit switch of claim 12 wherein the first output signal is a current control signal.

14. The limit switch of claim 13, wherein the current control signal is a 1–4 mA current control signal.

15. The limit switch of claim 13 wherein power for the limit switch is derived from the current control signal.

16. The limit switch of claim 12 wherein:
   the operators interface is communicatively coupled to the controller memory for entering second limit switch set point data defining a second threshold set point;
   the isolated communication link transfers the second limit switch set point data from the controller memory to the limit switch memory; and
   the limit switch microprocessor includes a second limit switch microprocessor output, the second limit switch microprocessor output being responsive to the second position sensor output signal and the second limit switch set point data stored in the limit switch memory to generate a second state signal, indicative of a second state of the valve being above or below the second threshold set point, at the second limit switch microprocessor output.

17. The limit switch of claim 16, including a second output coupled to the limit switch microprocessor second output for generating a second output signal indicating the state of the second limit switch.

18. The limit switch of claim 17, wherein the second output signal is a current control signal.

19. The limit switch of claim 11, wherein the second limit switch output is isolated from the first limit switch output.

20. The limit switch of claim 19, wherein the second output signal is optically isolated from the limit switch microprocessor.

21. The limit switch of claim 1 wherein the controller memory includes calibration data defining the range of motion of the valve, and the limit switch data defines the location of the threshold set point as a percentage of the range of motion.

22. For a digital valve positioning system comprising a valve, a valve controller having a controller microprocessor and a controller memory, a valve actuator having an output coupled to the valve to control the position of the valve over a range of motion in response to an output from the valve controller, and a first position sensor for determining the position of the valve, an intelligent limit switch for generating a limit switch state signal indicative of a state of the valve being above or below a threshold set point, the limit switch comprising:
   an operators interface communicatively coupled to the controller microprocessor for entering limit switch set point data defining the location of the threshold set point into the controller memory;
   a second position sensor generating an output signal indicative of the position of the valve;

a limit switch memory;

a limit switch microprocessor communicatively coupled to the limit switch memory;

an optically isolated communication link between the controller microprocessor and the limit switch microprocessor for transferring the limit switch set point data from the controller memory to the limit switch memory, wherein the limit switch microprocessor includes a first limit switch microprocessor output, the limit switch microprocessor being responsive to the second position sensor output signal and the limit switch set point data stored in the limit switch memory to generate the state signal at the first limit switch microprocessor output; and a first limit switch output coupled to the first limit switch microprocessor output for generating a first limit switch output signal indicating the state of the limit switch.

23. The limit switch of claim 22 wherein the first output signal is a current control signal.

24. The limit switch of claim 22 wherein the operators interface includes a display indicating the state of the limit switch.

25. The limit switch of claim 24 wherein the display is an LCD display.

26. The limit switch of claim 22 wherein:

the operators interface is communicatively coupled to the controller microprocessor for entering, into the controller memory, second limit switch data defining the location of a second threshold set point defining a second threshold set point;

the isolated communication link transfers the second limit switch set point from the controller memory to the limit switch memory;

the limit switch microprocessor includes a second limit switch microprocessor output, the limit switch microprocessor being responsive to the second position sensor output signal and the second limit switch set point data stored in the limit switch memory to generate a second state signal, indicative of a second state of the valve being above or below the second threshold set point, at the second limit switch microprocessor output; and the limit switch includes a second output coupled to the limit switch microprocessor second output for generating a second output signal indicating the secondary state of the limit switch.

27. The limit switch of claim 26, wherein the second output signal is a current control signal.

28. The limit switch of claim 26 wherein the second limit switch output is isolated from the first limit switch output.

29. The limit switch of claim 26 wherein the second output signal is optically isolated from the limit switch microprocessor.

30. The limit switch of claim 22 wherein the controller memory includes calibration data defining the range of motion of the valve, and the limit switch data defines the location of the threshold set point as a percentage of the range of motion.

* * * * *